(12) United States Patent
Fischbacher

(10) Patent No.: US 6,622,910 B2
(45) Date of Patent: Sep. 23, 2003

(54) METHOD AND APPARATUS FOR PRODUCING PERSONALIZED CHIP CARDS

(75) Inventor: Johannes Fischbacher, Munich (DE)

(73) Assignee: Giesecke & Devrient GmbH (DE)

( * ) Notice: Subject to any disclaimer, the term of this patent is extended or adjusted under 35 U.S.C. 154(b) by 0 days.

(21) Appl. No.: 10/205,221

(22) Filed: Jul. 26, 2002

(65) Prior Publication Data

US 2002/0179702 A1 Dec. 5, 2002

Related U.S. Application Data

(62) Division of application No. 09/466,221, filed on Dec. 17, 1999.

(30) Foreign Application Priority Data

Dec. 17, 1998 (DE) .......................................... 198 58 343

(51) Int. Cl.[7] ................................................. G06F 7/00
(52) U.S. Cl. ....................................... 235/376; 235/492
(58) Field of Search ................................. 235/376, 380, 235/492; 29/831, 739; 257/678, 679

(56) References Cited

U.S. PATENT DOCUMENTS

| 4,222,516 A | * | 9/1980 | Badet et al. ................ 235/492 |
|---|---|---|---|
| 4,460,825 A | * | 7/1984 | Haghiri-Tehrani et al. .. 235/488 |
| 4,825,054 A | | 4/1989 | Rust et al. ................... 235/380 |
| 4,827,425 A | | 5/1989 | Linden ........................ 364/478 |
| 4,829,666 A | * | 5/1989 | Haghiri-Tehrani et al. .... 29/841 |
| 4,855,578 A | | 8/1989 | Hirokawa et al. ........... 235/380 |
| 4,874,935 A | * | 10/1989 | Younger ...................... 235/492 |
| 4,889,980 A | | 12/1989 | Hara et al. ................... 235/488 |
| 5,049,728 A | | 9/1991 | Rovin ......................... 235/492 |
| 5,680,936 A | | 10/1997 | Beers ......................... 209/564 |
| 5,745,988 A | * | 5/1998 | Hohmann et al. ............. 29/841 |
| 5,943,769 A | * | 8/1999 | Hohmann et al. ............. 29/846 |
| 6,014,748 A | * | 1/2000 | Tushie et al. ................ 713/200 |
| 6,193,163 B1 | | 2/2001 | Fehrman et al. ............. 235/488 |

FOREIGN PATENT DOCUMENTS

| EP | 0311417 | 12/1989 |
| WO | WO 87/05420 | 9/1987 |

* cited by examiner

Primary Examiner—Diane I. Lee
(74) Attorney, Agent, or Firm—Bacon & Thomas, PLLC

(57) ABSTRACT

The invention relates to a method and apparatus for producing personalized chip cards containing an at least partly flat surface for visible application of data and an integrated circuit with memory. The problem of the invention is to state a method and apparatus for avoiding the abovementioned disadvantages, i.e. further reducing the reject rate in personalizing chip cards. This problem is solved by personalizing the integrated circuits and the card bodies separately from each other and subsequently incorporating the personalized circuit in the personalized card body.

5 Claims, 2 Drawing Sheets

METHOD AND APPARATUS FOR PRODUCING PERSONALIZED CHIP CARDS

This application is a Division of nonprovisional application Ser. No. 09/466,221 filed Dec. 17, 1999.

TECHNICAL FIELD OF THE INVENTION

This invention relates to a method and apparatus for producing personalized chip cards containing an at least partly flat surface for visible application of data and an integrated circuit with memory.

BACKGROUND OF THE INVENTION

International application WO 87/05420 describes a method for personalizing chip modules (i.e. inscribing and encoding them with data individual to the card) which are intended for incorporation in a card body. The method proposed therein first involves providing a coiled band with chip modules to be personalized. Said coiled band is subsequently supplied by clock to a contacting head which contacts and personalizes one chip module at a time. The personalized chip module is incorporated in an uninscribed card body either before or after personalization.

With this form of personalization it is no problem bringing chip and card body together since each chip fits into each card body. Especially in the variant in which an already personalized chip is incorporated in the card body, incorrectly personalized chips can be previously eliminated so that an error in personalizing the chip does not lead to a rejected card. The disadvantage of the shown method, however, is that if there is an error in later personalization of the card body, i.e. in inscribing the card with the later card user's personal data, the chip is also lost.

European patent application EP-A 0 266 926 discloses a method wherein an unpersonalized card body with an unpersonalized magnetic stripe and an unpersonalized chip is fed to an encoder for inscription of the magnetic stripe, IC personalization is subsequently performed, this is checked and in the next step the card body is inscribed, i.e. personalized. This again involves the disadvantage that an error in inscribing the card body renders the complete card including the chip useless.

A reduction of such rejects is obtained by the procedure according to European patent specification EP-B 0 311 417 where, although the chip is first personalized, a reader is provided for reading out the data from the chip for the further processing steps, namely personalizing the card body and magnetic stripe, the data being used for embossing and magnetic stripe encoding. This at least prevents a false allocation from being made during inscription of the card body so that it is hardly possible for the data stored in the chip and the data shown on the chip card surface not to match. A disadvantage still remains, however, in that inscription of the card body is done with the correct data but can be performed unsuccessfully for other reasons, e.g. due to soiling of the card surface or the like.

The problem of the invention is therefore to state a method and apparatus which avoid the abovementioned disadvantages, i.e. further reduce the reject rate in personalizing chip cards.

SUMMARY OF THE INVENTION

This problem is solved by the present invention. Advantageous developments of the invention are stated in the dependent claims.

The present invention provides for personalizing the integrated circuits and the card bodies separately from each other and subsequently incorporating the personalized circuit in the personalized card body.

This method has the advantage of minimizing rejects over the known method since it limits both errors in personalizing the chip and errors in personalizing the card body to the chip or card body. Thus the total card is not useless if only either the card body or the chip is not personalized properly. A further advantage results from the exact-piece incorporation of the chips or modules in the card body now possible, which contributes to a further cost reduction in production.

For simpler handling, the integrated circuits are embedded in modules and supplied to a contact station on a carrier band. Preferably, the contact station is a multi-contact station which permits testing and/or initializing and personalizing of several modules simultaneously. This permits the sensitive integrated circuits to be already surrounded by a module material in this production step, i.e. during contacting, so that the integrated circuit itself is already protected. Initializing is omitted if preinitialized chips or modules are already used on the carrier band.

Advantageously, a further test is performed after personalization of the integrated circuits to permit improperly initialized or personalized circuits to be eliminated before further processing. Alternatively, the integrated circuit itself can provide an error message to the outside to indicate improper personalization.

After personalizing, the module carrier band is preferably transported further to a punching apparatus in which the modules are punched out of the carrier band, whereupon they are delivered to an implanting apparatus for insertion into the card body. Advantageously, the chip can be read out again before punching so that in case of a preceding disturbance the personalized chip can be clearly identified.

According to an advantageous development of the invention the card blanks are placed in an encoded pallet simultaneously with personalization of the modules, the code being linked with the order of successfully personalized circuits so that the card bodies are personalized in the order in which personalized circuits or modules are present.

With chip cards also containing a magnetic stripe, the magnetic stripe can also be inscribed with personal data before or after personalization of the card body. The magnetic stripe encoding is reread and checked immediately after personalizing. Improperly encoded card bodies are eliminated and not provided with a chip or module. Reencoding can be done immediately with the next card body so that the order still matches the personalized chips. If reencoding does not directly follow, the personalized card bodies are put in the order of the personalized circuits with the aid of a sort buffer.

In order to eliminate improperly personalized circuits or card bodies one performs a check of correct allocation after insertion of the personalized circuit into the personalized card body.

Preferably, the completely personalized chip cards are then deposited in a sort buffer and subsequently stacked in a magazine. They are deposited in the sort buffer in an order given by the data records, which is determined by the client for example.

Independent claim 1 states an apparatus for producing personalized data carriers by the abovementioned method, and has a multicontact station in which the integrated circuits are subjected to an incoming test, i.e. their functionality is tested. Subsequently the chips or modules are initialized, unless preinitialized chips were used, and personalized. At the time the integrated circuits are disposed on a carrier band which supplies them to the multicontact station or transports them to a punching apparatus after personalization and optionally a check of correct personalization.

Parallel thereto is a magazine input apparatus which disposes unpersonalized card bodies on the encoded pallet. The apparatus further contains means for identifying the pallet code and allocating said codes to a personalizing data record with which the card body is finally personalized. In an apparatus for implanting the personalized integrated circuits the latter are incorporated in the personalized card body.

Advantageously, there is further a testing apparatus which performs a check for agreement of the data after the integrated circuits or modules are implanted in the card body. Instead of or in addition to said check for data agreement, the circuit can be tested for its operability at this point in order to detect damage of the ICs from implantation.

Finally, a sort buffer is provided in which the finished cards are deposited in a given order and stacked in a magazine. This permits the cards to be deposited in the magazine in a desired order for later processing.

In the following the invention will be explained more closely without restricting its universality with reference to the embodiments according to FIGS. 1 and 2, in which:

DESCRIPTION OF THE PREFERRED EMBODIMENTS

Figure 1:
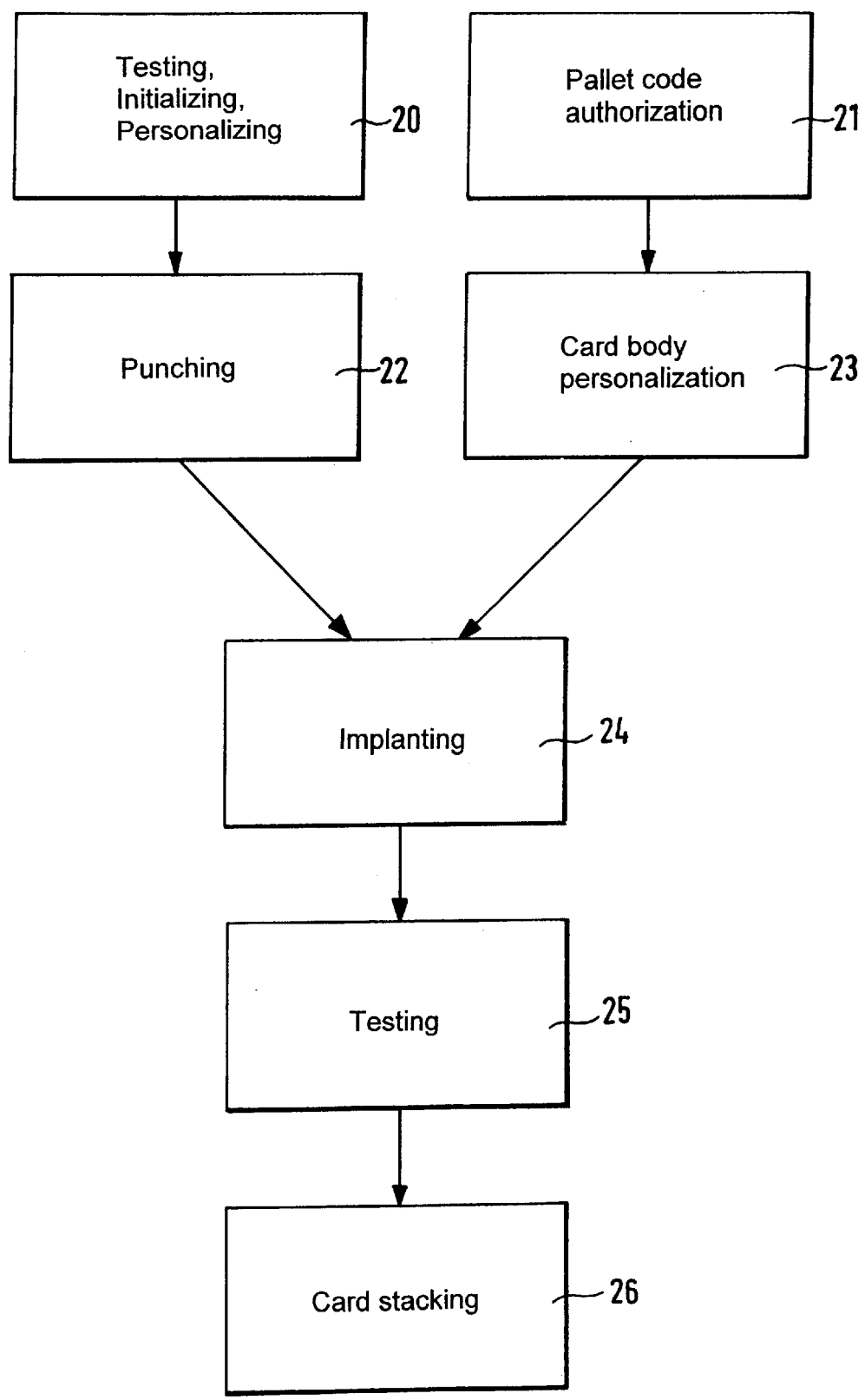
FIG. 1 shows a flow chart of the inventive method.

FIG. 1 shows a flow chart indicating the inventive production order for producing personalized chip cards.

In first method step 20 the integrated circuits or modules comprising the integrated circuits are subjected to an incoming test in a multicontact station. Subsequently, the approved chips are optionally initialized and personalized. During personalization, data records individual to the card are allocated to the individual chips in a given order. Personalization after the test and initialization ensures a very low error rate in personalization caused by chip defects or contact problems.

In next step 22 the integrated circuits or modules are punched out of the carrier band on which they are disposed for transport. Before punching, a matching criterion can advantageously be read out of the chip in order to restore synchronism in the personalization of the chip modules and card bodies in the case of a disturbance.

Parallel thereto, uninscribed card bodies with a gap for the module or integrated circuits are deposited in an encoded pallet in step 21. A code of the pallet is allocated to each module personalized in step 20.

Said code is evaluated in next step 23 during card body personalization so that the data record allocated to the code of the pallet can be used for personalizing the card body. In case the chip card contains additional magnetic stripes, magnetic stripe encoding is preferably done after chip personalization in the order of successfully personalized chips. Magnetic stripe encoding is preferably done before optical encoding.

In next step 24 the successfully personalized modules are implanted in the successfully personalized card bodies in the correct order.

Step 25 thereupon provides for a check for example with the aid of the read pallet code for ascertaining whether the personalized modules were allocated to the personalized card bodies properly or the chip was damaged during implanting.

Finally, in step 26 the cards are deposited in a magazine in the, or a, given order.

Figure 2:
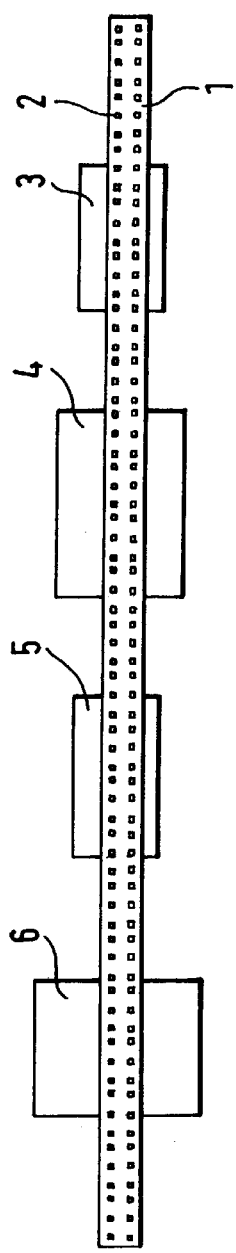
FIG. 2 shows an apparatus for carrying out said method.
Figure 2:
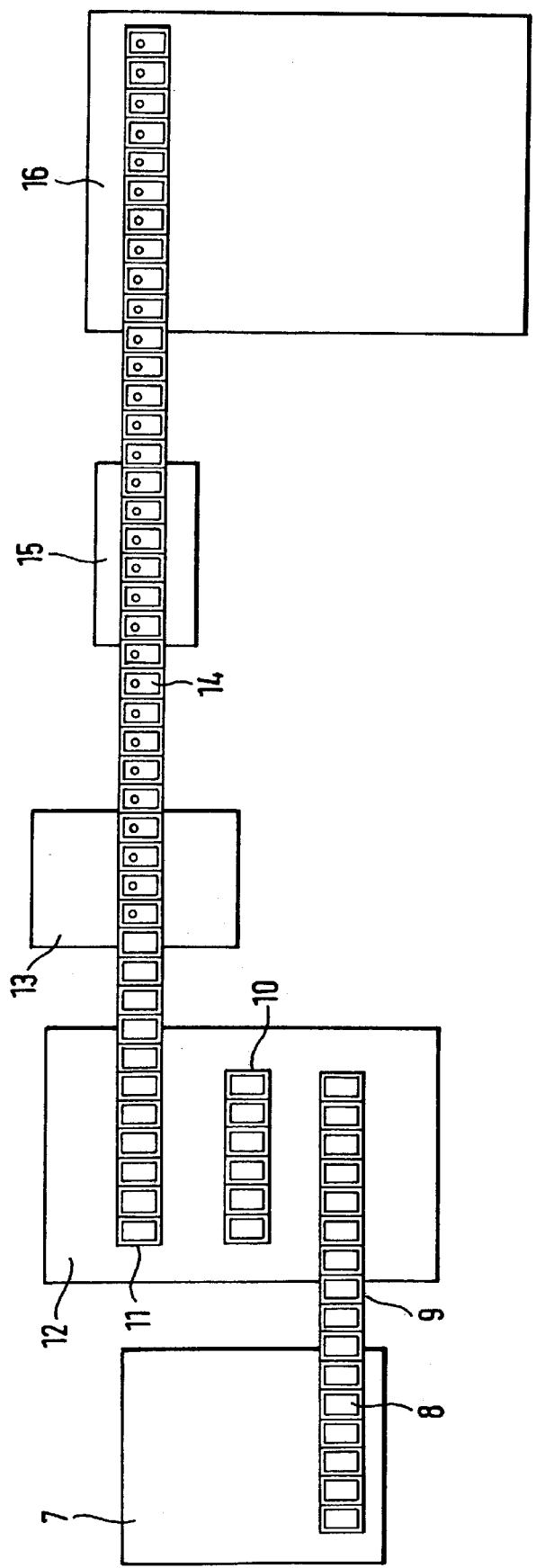

FIG. 2 shows an apparatus for advantageously applying the inventive method. Carrier band 1 rolled up in a coil on which integrated circuits 2 are disposed preferably in two rows is used for transporting the circuits or modules. Station 3 checks whether the carrier band is equipped with the modules correctly. Further, this station performs bad hole detection, i.e. checks whether the chips or modules were already identified as faulty in a preceding test, in order to permit a correction to be made in later personalization.

In multicontact station 4 the modules are first subjected to a functional test. In this station a given number of modules can be simultaneously contacted and thus processed. The approved circuits are optionally then initialized, whereupon the successfully initialized modules are provided with the data records individual to the card, i.e. personalized.

Then personalized modules 2 are supplied to optionally disposed readout station 5 which checks faultlessness again before the modules are punched out in punching device 6 and passed on to implanting apparatus 10.

Parallel to personalization of the modules, virginal card bodies 8 are made available in magazine input apparatus 7. They are applied to pallet 9 which is provided with an encoding. Each encoded pallet is allocated to a successfully personalized module so that personalization of the card bodies can be performed in personalizing apparatus 12 in the order of successfully personalized modules.

For personalization, the virginal card bodies are transported from magazine 7 on encoded pallet 9 to personalizing apparatus 12. On the way there, a testing apparatus can optionally be disposed for checking the card bodies for errors e.g. by optical means. In personalizing apparatus 12 the card bodies, singly or combined into group 10, are personalized with the allocated data record in accordance with the pallet encoding.

Subsequently, the pallets with the personalized card bodies are guided onto carrier band 11 and supplied to implanting apparatus 13. There, the personalized modules are inserted into the personalized card bodies. For a final check of correct complete personalization, completed chip cards 14 are supplied to checking apparatus 15 in which the data stored in the chip are read out and compared with the personalizing data applied to the card body and/or the pallet code. For checking the data one can use for example an image capturing unit with text recognition or bar code reading for detecting the data applied to the card surface.

Faulty cards are eliminated by unit 16 and repersonalization is initialized for the data record in question.

Finally, the tested cards are supplied to sort buffer 17 which deposits the completed chip cards in a magazine in an order given by the data records.

In case the finished chip card is also to contain a magnetic stripe, an apparatus for personalizing the magnetic stripe can also be disposed in personalizing apparatus 12.

I claim:

1. An apparatus for producing personalized data carriers comprising:

a carrier band arranged to supply integrated circuits or modules carrying integrated circuits;

a multicontact station arranged to test, initialize and personalize the integrated circuits;

a punching device arranged to punch out the personalized integrated circuits or modules from said carrier band;

a magazine input device configured to receive and pass unpersonalized card bodies onto encoded pallets;

an identification device configured to identify pallet codes and allocate the pallet codes to personalized data records of the card bodies; and an implantation device arranged to implant the punched integrated circuits or modules in personalized card bodies.

2. The apparatus according to claim 1, further comprising a testing device configured to determine whether the personalizing data record of the card body matches the personalizing data stored in the integrated circuit after the integrated circuit or module is implanted into the card body.

3. The apparatus according to claim 2, wherein said testing device includes a contact unit configured to read the personalizing data from the integrated circuit, a reading unit arranged to read the pallet code, and a comparing device configured to determine the correlation of the integrated circuit personalizing data and the pallet code.

4. The apparatus according to claim 2, wherein said testing device includes a contact unit configured to read the personalizing data from the integrated circuit, and an image capturing and processing unit configured to determine the personalizing data record of the card body applied to the card body.

5. The apparatus according to claim 1, further comprising a sort buffer configured to deposit personalized data carriers into a magazine in a predetermined order.

* * * * *